United States Patent [19]

Mistretta et al.

[11] Patent Number: 4,497,062

[45] Date of Patent: Jan. 29, 1985

[54] DIGITALLY CONTROLLED X-RAY BEAM ATTENUATION METHOD AND APPARATUS

[75] Inventors: Charles A. Mistretta; Walter W. Peppler, both of Madison; Balakrishna V. Kudva, Monona; Bruce H. Hasegawa; James T. Dobbins, III, both of Madison, all of Wis.

[73] Assignee: Wisconsin Alumni Research Foundation, Madison, Wis.

[21] Appl. No.: 501,607

[22] Filed: Jun. 6, 1983

[51] Int. Cl.³ ........................ G03B 41/16; H05G 3/00

[52] U.S. Cl. ........................................ 378/158; 378/62

[58] Field of Search ................. 378/156, 158, 62, 157; 364/414

[56] References Cited

U.S. PATENT DOCUMENTS

| | | | |
|---|---|---|---|
| 2,216,326 | 10/1940 | Smith | 378/158 |
| 2,744,031 | 5/1956 | Mumma . | |
| 3,074,801 | 1/1963 | Gessler et al. . | |
| 3,248,547 | 4/1966 | Van DeGeijn . | |
| 3,486,006 | 12/1969 | Siegel . | |
| 3,717,768 | 2/1973 | Edholm et al. . | |
| 3,748,487 | 7/1973 | Edholm et al. . | |
| 3,755,672 | 8/1973 | Edholm et al. | 378/158 |
| 3,917,954 | 11/1975 | Boge . | |
| 3,921,001 | 11/1975 | Edholm et al. . | |
| 3,961,121 | 6/1976 | Warsager . | |
| 4,322,619 | 3/1982 | Nelson | 378/62 |
| 4,347,440 | 8/1982 | Haas . | |

OTHER PUBLICATIONS

R. A. Kruger et al., "A Digital Video Image Processor for Real-Time X-Ray Subtraction Imaging," Optical Engineering, vol. 17, No. 6, Nov.-Dec. 1978, pp. 652-657.

D. B. Plewes et al., "Improved Lung Nodule Detection with an Equalized Image," SPIE, vol. 233, Application of Optical Instrumentation in Medicine VIII, 1980, pp. 183-189.

E. C. Pennington et al., "High Bandpass Spatial Filtering of the Primary X-Ray Beam," SPIE, vol. 233, Application of Optical Instrumentation in Medicine VIII, 1980, pp. 176-182.

L. Kusoffsky et al., "Attenuation Equalizing Filter in Diagnostic Radiography," Acta Radiologica Therapy Physics Biology 15, Jun. 1976, pp. 259-272.

Paul R. Edholm et al., "Primary X-Ray Dodging," Radiology, vol. 99, Jun. 1971, pp. 694-696.

"Digitally Controlled Beam Attenuator", Proceedings of SPIE, vol. 347, pp. 106-111.

*Primary Examiner*—Alfred E. Smith
*Assistant Examiner*—T. N. Grigsby
*Attorney, Agent, or Firm*—Isaksen, Lathrop, Esch, Hart & Clark

[57] ABSTRACT

X-ray compensation masks (51) are prepared by exposing an X-ray target object (43), such as a patient, to a first beam of X-rays. The X-ray fluence from the patient is received by an electronic image receptor (44) which provides an output signal indicating the intensity of the X-rays at all positions in the image field. The image information is converted by an image processor (47) to transformed X-ray intensity values for a plurality of pixels which cover the image field. A mask generating controller (48) determines the minimum transformed intensity value for any pixel, assigns to each pixel an attenuation number which is proportional to the difference between the transformed intensity value for the pixel and the minimum transformed intensity value, and issues control signals to a mask former (49) which deposits on a non-attenuating substrate (50) attenuating masses in a two dimensional array of pixels with the mass thickness in each pixel proportional to the attenuation number. When the mask (51) is inserted into the beam from the X-ray source (41), and a second exposure taken, the X-ray fluence passing through both the attenuating mask (51) and the patient (43) will be substantially equalized across the image field.

39 Claims, 12 Drawing Figures

DIGITALLY CONTROLLED X-RAY BEAM ATTENUATION METHOD AND APPARATUS

This invention was made with U.S. Government support under NIH Contract No. N01-HV-12905 awarded by the Department of Health and Human Services. The Government has certain rights in this invention.

TECHNICAL FIELD

This invention pertains generally to the field of X-ray imaging systems and particularly to systems and techniques for compensating and processing X-ray images.

BACKGROUND ART

A spatially uniform flux of X-rays will be attenuated to varying degrees at positions in a plane perpendicular to the flux as the X-rays pass through a patient as a result of the spatial variations in the thickness and composition of the portions of the patient through which the X-rays pass. This spatial variation in the transmission of X-rays through a patient allows an image of the internal structure of the patient to be formed. However, the typical wide range of X-ray intensities in the X-ray flux issuing from the patient tends to limit the useful information that can be gleaned from the visible image produced by the X-rays. Several factors contribute to the loss of information in the visible image and to errors in quantitative measurements: inadequate detector dynamic range resulting in increased system noise in the regions of low transmission; non-uniform quantum statistical fluctuations across the image (suboptimal exit exposure at portions of the image); degradation of image contrast due to limited detector latitude (e.g., X-ray intensities lying in the range of the film shoulder or toe); and severe degradation of contrast in regions of low transmission due to scatter (and veiling glare in the case of image intensification) from adjacent regions of high transmission.

The problem associated with inadequate detector dynamic range can be illustrated by considering the noise present in digital fluoroscopy systems where television camera noise dominates in the dark portions of the image. At smaller patient thicknesses the quantum noise dominates because the video signal is large compared to the camera noise; whereas, in the areas corresponding to the greatest patient thicknesses, the camera noise dominates. If the signal-to-noise ratio of the camera is not adequate to accommodate the useful dynamic range of the image, there will be objectionable noise in the dark regions. A related effect is the incorrect choice of X-ray operating factors caused by bright spots which confuse peak or area-detection devices during test-shot procedures. If X-ray factors are limited to keep bright spots within the range of signals which can be accommodated by the camera, other regions will have insufficient signal and will suffer excessively from system noise.

Where the detector system noise is small, such as where photographic film is used as the detection medium, the quantum statistical noise dominates. Thus, in chest radiography the contrast sensitivity in the regions of the mediastinum and heart is significantly lower than in the lung field where the intensity of the X-ray flux passing through the patient is greater.

The degradation of image contrast due to limited detector latitude is particularly important with photographic film where the range of transmitted X-ray intensities exceeds the linear portion of the film characteristic curve. The problem is especially severe when scatter reduction devices such as scanned slits are employed, since the image dynamic range in the chest increases greatly.

X-rays scattered from highly transmissive areas in the body reduce contrast in adjacent, darker regions. For example, most of the scatter in chest radiography is due to the highly transmissive lung field rather than the denser regions of the chest because of the greater attenuation of the scattered X-ray photons produced in the denser regions. Similar effects cause significant artifacts in digital angiographic studies of the head where intracranial carotid arteries pass over the dense petrous bone. In this dense region, the arteries appear to have decreased iodine content because cross-scatter from adjacent regions affects the logarithmic amplification of the signal which is employed to render differential iodine signals independent of the local transmission values. The presence of scatter and glare within the image intensifier transfers the signal to the wrong portion of the logarithmic response curve.

Errors can be introduced into quantitative measurements because of non-uniform transmission, as in the measurement of injected iodine where (for small iodine thicknesses) the measured thickness is linearly related to actual thickness, but the constant of proportionality may vary by a factor of two or three as a result of X-ray beam hardening and scattered radiation. Because the scatter field is not uniform, it is not possible to subtract the scatter components in a completely uniform fashion when attempting to measure the thicknesses of iodine injected vessels.

With the exception of computed tomography and digital subtraction angiography, image processing following data aquisition has been largely ineffective in improving image quality. If noise is reduced, high frequency information is also reduced, with a corresponding loss of spatial resolution and local contrast. Contrast enhancements such as high-pass filtration or unsharp masking generally enhance high frequency noise.

Several techniques have been attempted to improve the radiographic image quality. The present invention pertains to techniques which employ an attenuating filter in the path of the X-rays ahead of the patient which compensates for variations in patient thickness and attentuation across the imaging field. Such filters potentially allow the entire imaging field to be placed within the linear region of the film characteristic curve and can allow the use of film with narrower latitude to increase image contrast. Such filters can also reduce spatial variations in the X-ray flux to the image receptor, reducing contrast degradation due to radiation scattered from bright to dark areas, allowing all regions to be imaged with almost maximum signal amplitude to minimize the influence of system and quantum statistical noise. However, presently available compensating filters have not gained wide acceptance in diagnostic radiology due to the difficulty of manufacturing the filters and the need to tailor the filters to the anatomical requirements of each patient and to the X-ray spectrum being used. The construction of relatively detailed filters using prior techniques has proven to be time consuming, so that, with such techniques, a filter could not be constructed and used in a single diagnostic session with a patient.

SUMMARY OF THE INVENTION

In accordance with the invention, X-ray compensation masks are prepared rapidly and economically from a first exposure of the patient, or other X-ray target object, to a beam of X-rays which, after passing through the patient, is received by an electronic image receptor. The image receptor provides an output signal containing data indicating the intensity of the X-rays at all positions in the image field. This image information is converted by an image processor to X-ray intensity values for a plurality of sub-fields or pixels which cover the desired image field in a two dimensional array. The processor also determines a value for the X-ray intensity at each pixel in the array which is transformed to account for the non-linear transmission through the object; e.g., the transformed value may be the logarithm of the intensity. This information from the processor is used by a mask generating controller to determine the minimum transformed intensity value for any of the pixels and to assign to each pixel an attenuation number which is functionally related to the difference between the transformed intensity value for the pixel and the minimum transformed intensity value. The controller then issues control signals to a mask former, such as a dot matrix printer, which deposits on a non-attenuating mask substrate a two dimensional array of masses of attenuating material of varying thicknesses, preferably in layers, with the thickness or number of layers in each mask pixel being proportional to the attenuation number for that pixel determined by the mask generating controller.

The material in the attenuating masses that is laid down on the substrate contains an X-ray attenuating material, such as cerium (e.g., in cerous oxide), and may be deposited from a ribbon having a layer of the attenuating compound thereon, with the attenuating material being transferred from the ribbon to the substrate by a dot matrix printing head. Other forming techniques such as ink jet printing may also be used to build up the masses. The mask may be formed on a single non-attenuating substrate with multiple layers of the attenuating material built up on the substrate, or several substrates may be used which overlap one another, with layers of attenuating material on each substrate, such that the total attenuating mass required in each pixel of the mask array is provided when the substrates are registered over one another.

After the mask is formed, it is indexed into a registered position between the X-ray source and the object to be X-rayed, such as a patient, and a second X-ray exposure is made. The X-ray fluence passing through both the attenuating mask and the object will thus be substantially equal across the image field.

The substantial equalization of X-ray transmission across the field exiting from the patient significantly improves the quality of single energy radiographs by preserving local contrast but allowing the use of high contrast, narrow latitude film. Because large variations in dynamic range are eliminated, the contrast of all anatomical structures can be additionally enhanced by using low X-ray energies. The reduction of dynamic range reduces the effect of image intensifier veiling glare from high transmission to low transmission areas, and also substantially reduces the effect of scatter from areas of high transmission to areas of low transmission. The reduction of the dynamic range also has the effect of substantially improving the signal-to-noise ratio and local contrast of the entire image simultaneously. Improved image quality is obtained in applications such as digital subtraction angiography because regions of excessive transmission are reduced. Improved quantitative measurements of iodine thicknesses in vessels are obtainable because the effects of scatter and image intensifier veiling glare are rendered more uniform so that they may be more accurately accounted for.

In addition to forming compensation masks adapted for use at a single X-ray energy level, the invention can be utilized to permit the recording of high resolution subtraction images with substantial selective material enhancement using common film receptors (e.g., screen-film combinations) but not requiring multiple film processing. The technique involves the formation of an attenuation mask based on information derived from an exposure of the object at a first X-ray energy level. Following insertion of the mask between the source and the object, a film receptor is placed in front of the electronic receptor and is exposed, through the mask, at a second energy level. By adjusting the relative thickness of the layers in the mask, various material cancellation conditions can be created within the X-ray beam reaching the film. For example, the second exposure X-ray energy level and the attenuation layer thickness can be selected to provide substantial cancellation of bone within a patient to enhance soft tissue contrast.

Further objects, features and advantages of the invention will be apparent from the following detailed description taken in conjunction with the accompanying drawings.

BEST MODE FOR CARRYING OUT THE INVENTION

Figure 1:
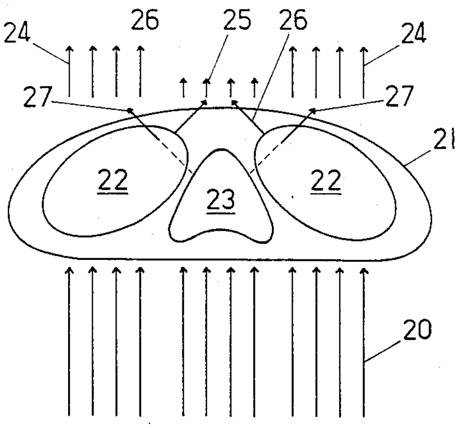
FIG. 1 is a schematic cross-sectional view of the chest area of a patient receiving a uniform flux of X-rays.

A schematic diagram of a human body chest cross-section is shown in FIG. 1 to illustrate the effect of a uniform (and, in the case shown, collimated) flux of X-rays 20 which enter the schematically represented body 21. The human body is not uniform in cross-section; additionally it has regions of low density such as the lungs 22 and regions of particularly high density such as in the mediastinum and heart region 23. Thus, the intensity of the X-rays exiting from the body in the lung regions, indicated generally at 24, is substantially greater than the intensity of the X-rays exiting from the central regions of the body, indicated generally at 25. In addition, scatter radiation 26 from the highly transmissive lung field overlaps the low intensity radiation 25 while a smaller amount of scattered X-rays 27 are produced from the denser regions 23. The non-uniform average X-ray intensity reduces the quality of the X-ray images obtainable from the film, while the substantial scatter radiation emanating primarily from the low density areas degrades the quality of the image obtainable behind the high density areas. Of course, much finer high and low density areas are present in the body than are illustrated in FIG. 1, and these regions also vary over the elevation of the body as well as through the cross-section.

Figure 2:
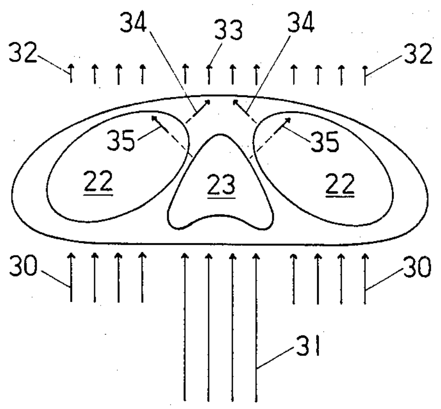
FIG. 2 is a schematic cross-sectional view of a patient as in FIG. 1 illustrating the X-ray flux with a compensation mask.

The qualitative effects of a compensating attenuation mask interposed between the X-ray source and the patient are shown in FIG. 2. The X-ray fluence 30 which impinges upon the patient in the areas of high transmission is much reduced, whereas the fluence 31 entering the patient at the regions of low transmission is reduced a lesser amount if at all, so that the intensity of the X-rays 32 exiting from the regions of high transmission is essentially equal to the intensity of the X-rays 33 exiting from the regions of low transmission. The substantial spatial uniformity of the X-ray fluence from the patient reduces the dynamic range of intensities that must be accomodated by the detector. Also of substantial significance is the fact that the scattered X-rays 34 from the lung field 22, which cross over and mix with the fluence 33 from the regions of low transmission, are of much lower intensity because the X-ray fluence entering the highly transmissive lung fields was initially of lower intensity. The scattered X-rays 35 from the high density areas are essentially of equal intensity as the scattered X-rays with no compensating mask in place, but are not a substantial problem because fewer scattered X-ray photons emerge from the high density areas because of the greater overall attenuation in these areas.

Figure 3:
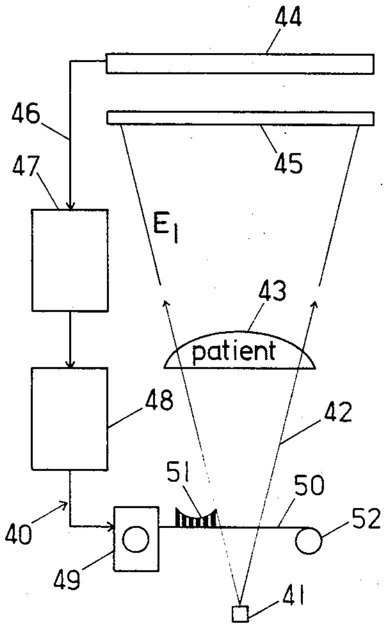
FIG. 3 is a schematic view of the X-ray beam attenuation apparatus of the invention utilized to take a first exposure of a patient.

Apparatus for carrying out the production and use of a compensating mask in accordance with the present invention is shown schematically at 40 in FIG. 3. An X-ray source such an X-ray tube 41 produces a cone shaped beam 42 of X-rays which passes through the patient (or other object being imaged) 43 and then impinges upon an X-ray image receptor 44 such as an image intensifier and television camera or a fluoroscopic screen. A scatter grid 45 may be interposed in the path of the X-rays ahead of the image receptor 44, if desired. The electronic image receptor 44 generates an output signal on a line 46 which is indicative of the intensity of the X-rays impinging upon the image receptor at particular positions in the field of the receptor, e.g., the output signal may be a modulated video signal varying in amplitude as the image field is scanned. This signal is converted to digital data in an analog-to-digital converter and digital image processor 47 and the processed data is provided to a mask generating controller 48 which processes the image data to provide control signals for production of the mask. As explained further below, the image data to be provided to the mask generator 48 is resolved into a two dimensional array of small fields or picture elements (pixels) with an intensity value assigned to each pixel based on the magnitude of the X-ray intensity reaching the image receptor at the position in the image field of the receptor corresponding to the particular pixel. The mask generating controller then provides control signals to a mask former 49 (e.g., a dot matrix printer) to cause it to deposit on a non-attenuating substrate sheet 50 (e.g., paper) an image formed by variations in the thickness of the deposited X-ray attenuating masses from pixel to pixel, with the thickness at each mask pixel being related to the X-ray intensity value recorded for the corresponding image pixel. The attenuating masses are advantageously deposited in layers with each layer in the printed image containing an X-ray absorber material, such as cerium in the form of cerous oxide, and the image built up on the substrate 50 forms a mask 51 which has a thickness of overprinted layers of X-ray absorbing material varying in two dimensions, pixel to pixel, in relation to the intensity of X-rays which have been detected by the image receptor 44.

Figure 4:
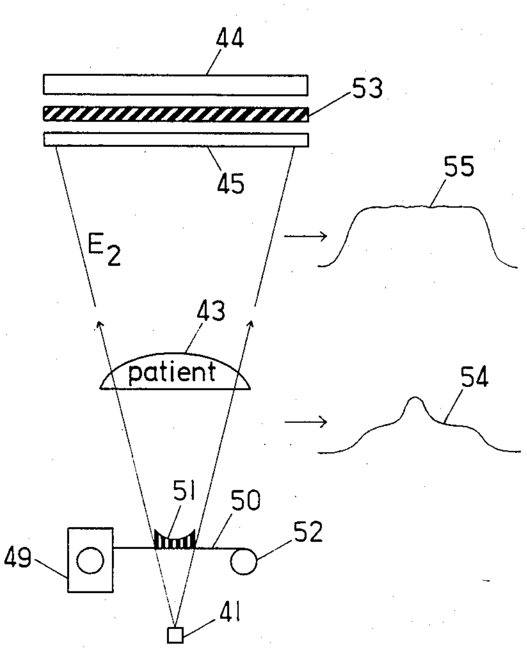
FIG. 4 is a schematic view of a portion of the apparatus shown in FIG. 3 with the mask in place and a second exposure of the patient being made.

The mask 51 carried on the substrate 50 is then indexed, by driving a takeup reel 52, to register it in proper position in the X-ray beam from the source 41, as shown in FIG. 4. If film is to be used as a final image receptor, a film cassette 53 is inserted into the path of the X-rays from tne patient 43, and the X-ray source 41 is activated. For purposes of illustration, the X-ray intensity cross-section after passing through the mask 51 is illustratively shown in the graph labeled 54 in FIG. 4, being non-uniform, while the intensity of the X-ray fluence after passing through the patient will be substantially uniform, as illustrated in the graph labeled 55.

The reduction of dynamic range obtained by use of the beam attenuating compensation apparatus 40 depends on the accurate positioning of the compensation mask 51 in the imaging field so that the beam is properly attenuated in inverse relation to the transmissibility of the patient. It is noted that, in nonsubtractive applications, if the focal spot from which the X-rays emanate were infinitesimal and if the mask were a perfect match for the transmissibility of the patient, the match between the structures in the imaging field and the projection of the attenuation mask would be perfect and all information would be removed from the image. However, in practical X-ray systems, the focal spot is finite and blurs the mask structure; the resulting image is similar to that obtained by unsharp masking in which low frequency information is suppressed. It may be noted that the present attenuation masking technique yields images fundamentally different from those obtained through processing of the image after acquisition without masking since such techniques enhance all high frequency information, including noise. The present digital beam attenuation mask combines edge enhancement (causing low frequency suppression) with reduction of noise in the image.

Figure 5:
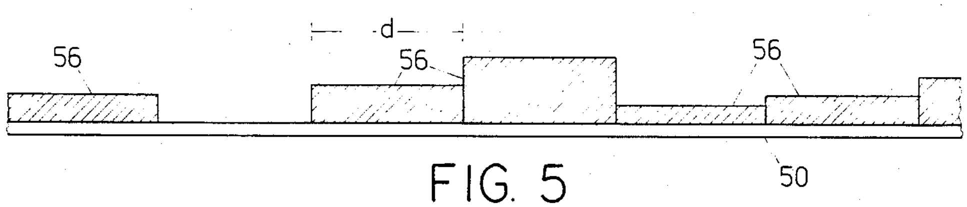
FIG. 5 is an illustrative cross-sectional view of a portion of a compensation mask showing the placement of the attenuating masses in pixels thereon.
Figure 6:
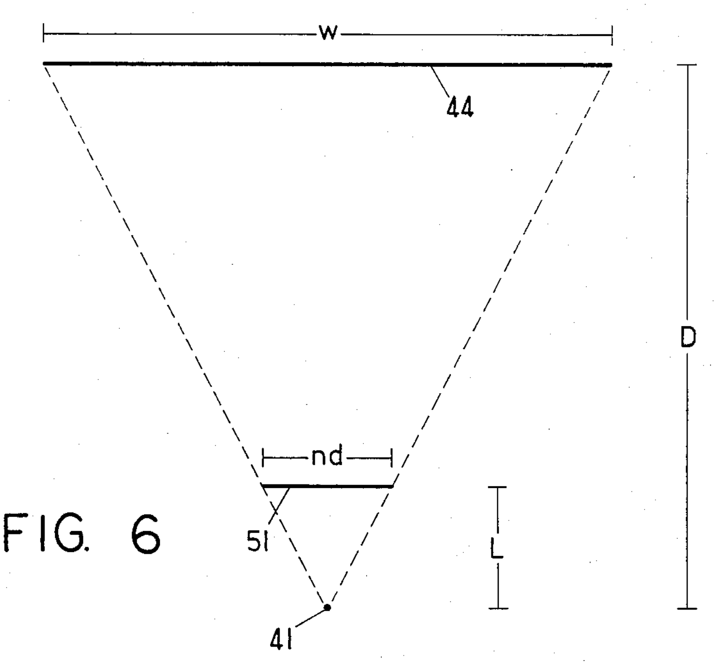
FIG. 6 is a diagram illustrating the placement of the attenuation mask with respect to the X-ray source.

The compensation mask 51 consists of a number of attenuation pixel masses 56 situated within small square fields or pixels on a non-attenuating substrate 50, as illustrated in the cross-sectional schematic view of the mask in FIG. 5. Attenuating material preferably uniformly fills the area of each pixel in which the material is deposited, with the thickness of the material varying from pixel to pixel. For a mask having n attenuation masses across its width, and a pixel width of d, the required mask width $W_m$ is nd. As illustrated in FIG. 6, the mask 51 is located a distance L from the focal spot of the X-ray source 41, and the plane of the image receptor 44 is located a distance D from the focal spot, with W being the width of the image receptor. Thus, the distance L between the focal spot and the attenuation mask is given by $L=ndD/W=W_mD/W$. The central axes of the image receptor 44 and the attenuation mask 51 must align with each other and the focal spot of the X-ray source 41 to ensure proper registration.

Figure 7:
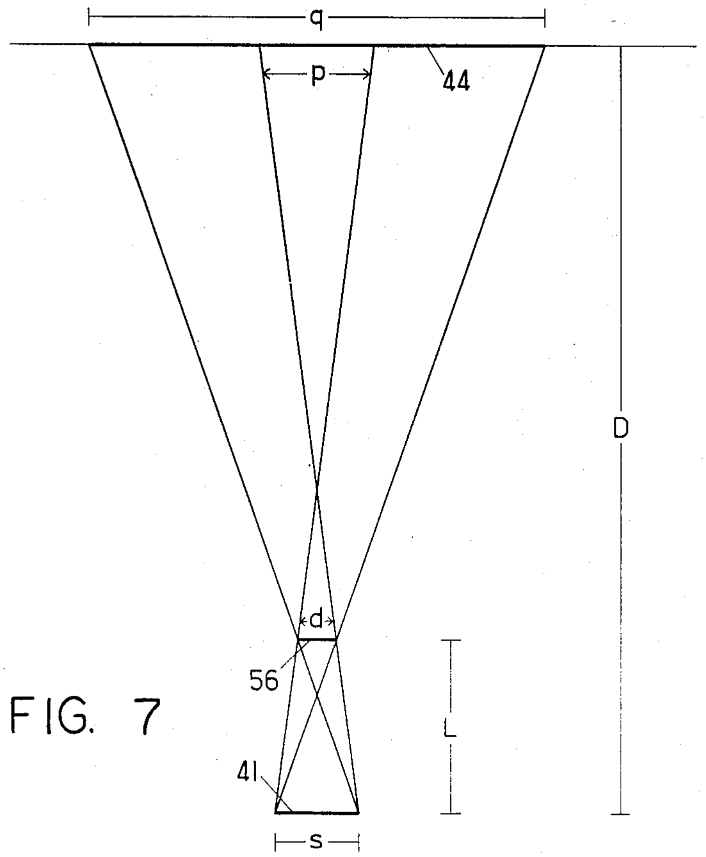
FIG. 7 is a diagram illustrating the blurring of the image on the receptor of a single pixel attenuation mass.

FIG. 7 is a view of the relationship between the focal spot 41 and a single pixel mass 56 on the attenuation mask, illustrating the blurring of the image of the pixel on the image plane. A focal spot of width s (typically 1 mm) projected across a single attenuation pixel mass of width d (e.g., 10 mils or 0.254 mm) onto the image receptor 44 provides a blurred image which consists of two parts. The central region of width p corresponds to an area of constant attenuation; beyond the central region the attenuation decreases linearly out to a projection of width q beyond which no attenuation occurs for the particular pixel mass illustrated. The trapezoidal pattern of attenuation changes with position and has a zero value for points where the attenuation pixel mass is out of the line of sight between the focal spot and the image receptor; within the shadow of width q but outside of the central region of width p, as one moves closer to the center of the shadow, a linearly increasing fraction of the attenuation pixel mass intercepts photons from the focal spot. In the central region, of width p, the projection of the pixel mass is contained completely within the focal spot projection and the pixel mass attenuates a constant fraction of the photons. From consideration of the modulation transfer function of the focal spot blurring, it can be shown that the unsharp masking produced by such a mask yields an X-ray intensity image with high-pass filtered spatial frequencies, with higher cut off frequencies being produced by masks with progressively larger numbers of pixel masses in the array.

The selection of the attenuation mass thickness or the number of layers required at each pixel in the attenuation mask may be illustrated with reference to FIG. 3. The signal produced by X-rays reaching a certain area in the image plane at the receptor 44 results from the absorption of some number of photons—for example, in an image intensifier. A voltage signal proportional to the number of absorbed photons is produced by the image intensifier, television camera, and analog preprocessing circuitry. The analog signal on the line 46 is transformed to a digital value by an analog-to-digital converter followed by a conversion in the image processor 47 to provide a compensated or transformed intensity value for each pixel. Compensation of the intensity values from the receptor is usually required because the intensity of X-rays passed through an object (if uniform) decreases exponentially with the thickness of the portion of the object through which the X-rays pass. Thus, the logarithm of the intensity value is usually taken to provide a transformed value which is approximately linearly related to the thickness of attenuating material traversed by the X-rays. Other compensation functions may also be used, such as finite power series approximations of the logarithm function, and the compensation may also be performed at the image receptor (e.g., in the image intensifiers or the television camera). Where a logarithmic compensation is properly performed, the pixel logarithmic intensity value P is given generally by the expression (log refers to natural logarithm herein): $P=b\log(cN)$—where b is a multiplier introduced by the logarithmic transformation and c is the product of the gains due to the image intensifier, television camera, analog preamplifier and analog-to-digital converter.

An attenuation number n representing the relative thickness or, equivalently, the desired number of layers in the mask at a given pixel location in the imaging field, may be derived utilizing the pixel logarithmic intensity value P given above in accordance with the following equation:

$$n = \frac{1}{\mu x}\log\frac{N}{N_0} = \frac{P - \mathrm{MIN}}{A\mu x}$$

where $N_0$ is the number of photons from the darkest (least transmissive) portion of the imaging field; N is the number of photons at the point of interest in the imaging field, $\mu$ is the linear attenuation coefficient for the attenuation material, x is the incremental thickness of attenuation material (e.g., one layer of a multilayer mask), P is the pixel transformed (logarithmic) intensity value corresponding to the photon intensity N, MIN is the pixel transformed (logarithmic) intensity value corresponding to the photon intensity $N_0$, and A is a transformation (logarithmic) gain constant. In accordance with this equation, the thickness of attenuating material (or number of layers) needed at a particular point in the attenuation mask depends on the difference in pixel logarithmic intensity values between the point of interest and the least transmissive portion of the image, the linear attenuation coefficient of the mask material, the thickness of one layer, and the gain of the logarithmic transformation in the image processor. The equation also depends on the X-ray energy of the X-ray source 41 since the value of the attenuation coefficient $\mu$ has a spectral dependence. If the effective energy of the X-ray beam is known, all quantities can be determined following acquisition and processing of a digital image and can be used to generate the compensation mask. While the attenuation number for each pixel will generally be proportional to the difference between the transformed pixel intensity value and the minimum pixel value, the constant of proportionality may be chosen differently for various pixel positions, for the reasons discussed below.

For applications in temporal subtraction, the background structure introduced by the compensation mask will be removed during the subtraction process. For such processes, the primary purpose of the mask is to minimize the dynamic range of the imaging field and thereby maximize the signal-to-noise ratio of the image. From the quantities defined above, the residual image dynamic range R can be determined as $R=N/N_0$ which can be substituted into the equation above to obttain the value of the maximum single layer thickness X in accordance with the following:

$$x=(\log R)/\mu$$

This single layer thickness x limits the dynamic range within the imaging field to a value R.

It is apparent that the desired thickness of attenuating material at each mask pixel may be similarly calculated if it is more convenient to deposit the material continuously rather than in discrete layers. For continuous deposit, the attenuating number, proportional to desired thickness, would be equal to $(P-MIN)/A\mu$.

When the beam attenuator apparatus 40 is used with photographic film, a digital premask image must be acquired from which the mask can be generated. If the imaging field is larger than about 23 centimeters in diameter, conventional image intensifiers will be too narrow to be used or may introduce spatial distortion into the premask image. For such larger field sizes, the premask image can be acquired using a fluorescent screen which is viewed by a television camera behind it to provide a large format with reduced spatial distortions. Other two dimensional electronic visual detectors such as photosensitive diode arrays may alternatively be utilized instead of the fluorescent screen and television camera.

Where film is used as the final detector, the single layer thickness is preferably chosen so that the mask structure introduced into the image is not distracting, and thus the border between regions in the mask with single layer differences should be imperceptible. However, the effect of relatively thick single layers will be moderated because the blurring by the finite focal spot will suppress the perceptibility of sharp edges in the mask. In addition, scatter radiation also will decrease contrast and suppress the perceptibility of sharp edges.

Figure 8:
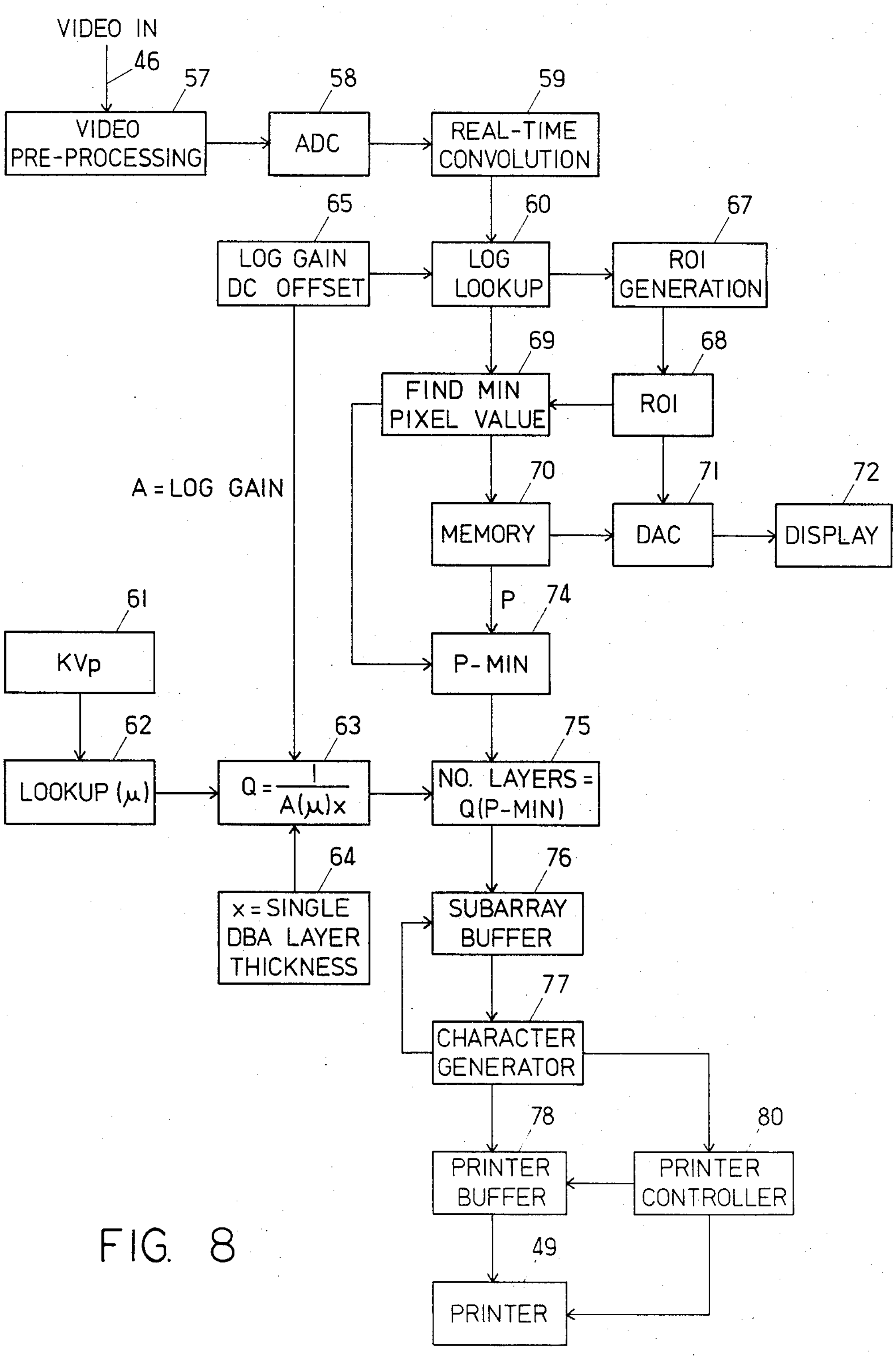
FIG. 8 is a block diagram of the functional operations carried on by the apparatus of the invention to form the compensation masks.

A block diagram of a hardware implementation of the functions of the digital image processor 47 and the mask generating control system 48 is shown in FIG. 8. For simplicity, the circuits required for timing and control as well as memory indexing are not shown. The acquisition and storage of the digital image used to construct the attenuation mask 51 in accordance with the system of FIG. 8 is based on a model that assumes that 8-bit resolution in the image is sufficient; this will ordinarily be the case since it is unlikely that more than 255 layers in the attenuation mask would ever be necessary. Such digital video image processing is presently in use. See, e.g., R. A. Kruger, et al, A Digital Video Image Processor for Real-Time X-ray Subtraction Imaging, *Optical Engineering* Vol. 17, No. 6, November–December 1978, pp. 652–657. The video signal on the line 46 from the image receptor 44 is provided to a video preprocessing circuit 57 for gain adjustment and wave shaping and thence to an analog-to-digital converter 58 which digitizes the signal and provides its output to a real-time convolution circuit 59. Although not essential, convolution of the video input signal is of benefit for two reasons. First, the determination of the proper thickness or number of layers in the compensation mask requires an analysis of the video density which is complicated by the presence of scatter and glare crossing from one section of the image to another. Convolution of the video signal can reduce the effect of scatter and glare. Second, if the focal spot provides insufficient blurring for the desired high pass characteristics in the mask-attenuated image, the convolution circuit can be used to increase blurring of the input signal before the mask is constructed.

Following spatial filtering by the convolution circuit 59, the signal is provided to a logarithm look-up circuit 60 which provides an output pixel logarithmic intensity value P which is a function of the logarithm of the input signal. As noted above, the attenuation coefficient $\mu$ is a function of the kilovolt level of the X-ray source. Thus, the X-ray source level is either manually set by the operator or automatically determined from the setting of the X-ray machine through an input circuit 61 which transmits the kVp level to a look-up memory circuit 62 which determines an appropriate value for the attenuation coefficient as a function of the kVp level, and outputs a data signal indicative of the selected attenuation coefficient to a multiplication circuit 63 which also receives a signal indicating the thickness x of a single layer of the mask from an input circuit 64. The circuit 63 also receives a constant A from the logarithmic gain and offset circuit 65 corresponding to the gain provided to the logarithm of the video signal at the logarithm look-up circuit 60. The circuit 63 calculates an adjustment coefficient Q according to the equation: $Q=1/A\mu x$.

The logarithms of the video signals are transferred from the logarithm look-up circuit 60 to a region of interest (ROI) generation circuit 67 which excludes regions in the video field corresponding to circular blanking or regions behind the collimators, since these areas should not contribute to the minimum pixel value in the image, and the region of interest data is transferred and stored in a memory circuit 68. The pixel logarithmic intensity values from the log look-up circuit 60 are supplied to a circuit 69 which determines the minimum of all the pixel values within the region of interest determined from the regions stored in the memory circuit 68. All of the pixel logarithmic intensity values are then stored in a memory 70 and can be supplied through a digital-to-analog converter 71, within the region of interest determined from the circuit 68, to a video display 72 for immediate view by the operator.

The minimum pixel value MIN is supplied from the circuit 69 to a subtraction circuit 74 which subtracts the minimum pixel value MIN from each pixel logarithmic intensity value P supplied, in turn, from the memory 70. The difference signal from the circuit 74 is then supplied to a multiplying circuit 75 which multiplies the difference $P-MIN$ times the adjustment coefficient Q from the circuit 63 to provide a signal indicating the number of layers n in the corresponding pixel in the mask according to the equation: $n=Q(P-MIN)$.

The layer values n are stored in a subarray buffer 76 and then provided to a character generator 77 which forms graphic characters to be used by the printer in laying down the correct number of layers, as explained further below. The output of the character generator is supplied to the printer buffer 78 and thence to the printer 49, all under the control of a printer controller 80. The character generator 77 also generates and loads the buffer 78 with characters for carriage return and line feeds.

The foregoing implementation may also be modified to allow pixel averaging so that smaller attenuation masks (e.g., $64\times64$ or $128\times128$) can be generated from a $256\times256$ image.

The foregoing operations may also be carried out using a programmable computer as the mask generator 48 operating on the pixel logarithmic intensity values from the digital video image processor 47 (which itself incorporates the circuit function blocks labeled 57, 58, 59, 60, 65, 67 and 68 in FIG. 8) and supplying the control signals directly to the printer 49.

The transfer of the image from the image processor 47 to the computer begins with the operator defining the borders of transfer using switches on the front panel of the image processor 47. The image processor automatically sets a region of interest (ROI) over a single column of pixels in the image. Logarithmic intensity values of pixels in this column are transferred at the rate of one pixel per video line so that all pixels in the column are transferred during a video field. At the end of the video field, the ROI is advanced to the next column of pixels so that an entire image matrix can be transferred in a corresponding number of video fields (e.g., a 256×256 image matrix can be transferred in 256 video fields). The data may alternatively be directly accessed from the memory in the image processor to the computer memory rather than requiring software control.

Figure 9:
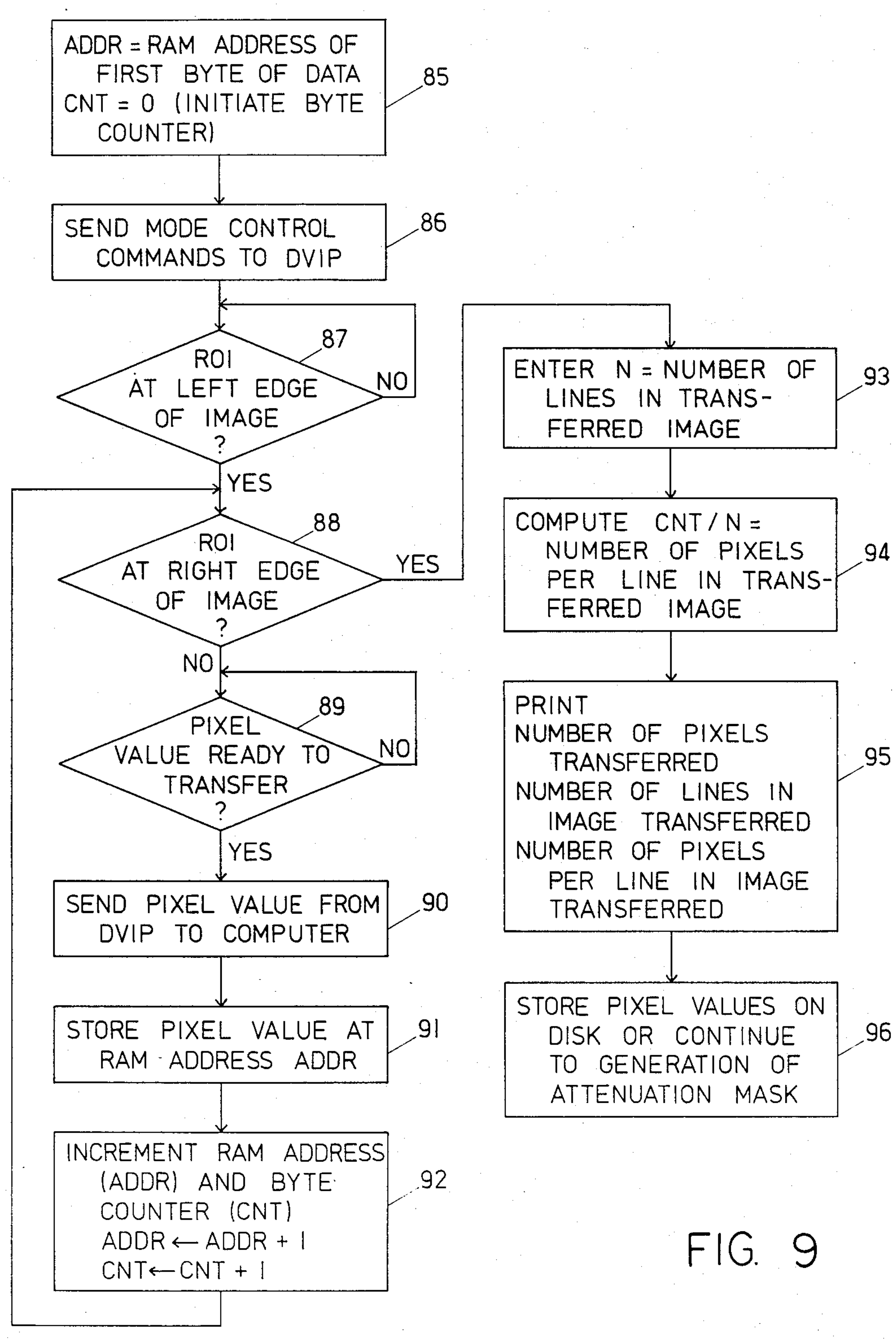
FIG. 9 is a flow chart illustrating a computer program for transferring pixel logarithmic intensity values from the image processor to the computer.

A flow chart of the image transfer program is shown in FIG. 9. The program first sets the initial values of two variables (block 85): ADDR, the random access memory (RAM) address of the pixel logarithmic intensity values from the image processor, and CNT, a variable which records the number of pixels that have been transferred. Thereafter, control commands are sent to the digital video image processor (DVIP) 47 (block 86) to set pixel transfer rates and to clear the output registers. The interface requires that the transfer of data to the computer be synchronized with the sweep of the ROI across the image. To establish this synchronization, the program tests a status signal, sent from the DVIP 47, which indicates when the ROI is at the left edge of the image (block 87) before proceeding with transfer. As transfer progresses, the program then tests whether the ROI is at the right side of the image (block 88) which, if so, indicates that image transfer is complete and that the program can exit from the data transfer loop. If the termination signal is not detected, the program loops until a pixel value is ready to transfer (block 89). Following transfer of the pixel value from the DVIP to the computer (block 90), the pixel value is stored in the random access memory (RAM) at block 91, the RAM address (ADDR) and the byte counter (CNT) are incremented (block 92), and the program returns to the beginning of the data transfer loop at block 88. When the ROI is at the right edge of the image, as determined at block 88, the program leaves the data transfer loop and the operator then enters the number of lines in the transferred image (block 93). Alternatively, television synchronization pulses may be counted to yield the number of lines in the transferred image. The number of pixels per line in the transferred image is computed (block 94) and the number of pixels, number of lines, and number of pixels per line in the transferred image is printed (block 95). The operator can then store the pixel values on a memory disc for later use or can continue directly to generation of the compensation mask (block 96).

Figure 10:
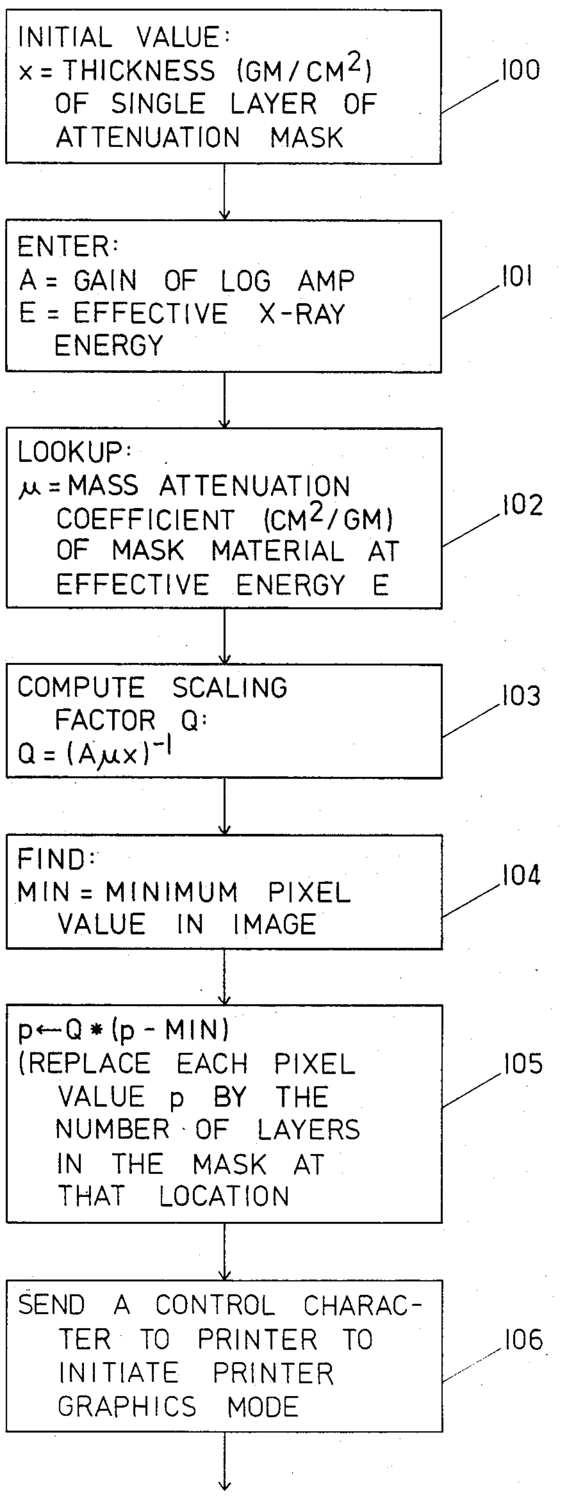
FIG. 10 is a flow chart of a computer program for finding the minimum pixel logarithmic intensity value and calculating an attenuation number for each pixel in the compensation mask.
Figure 11:
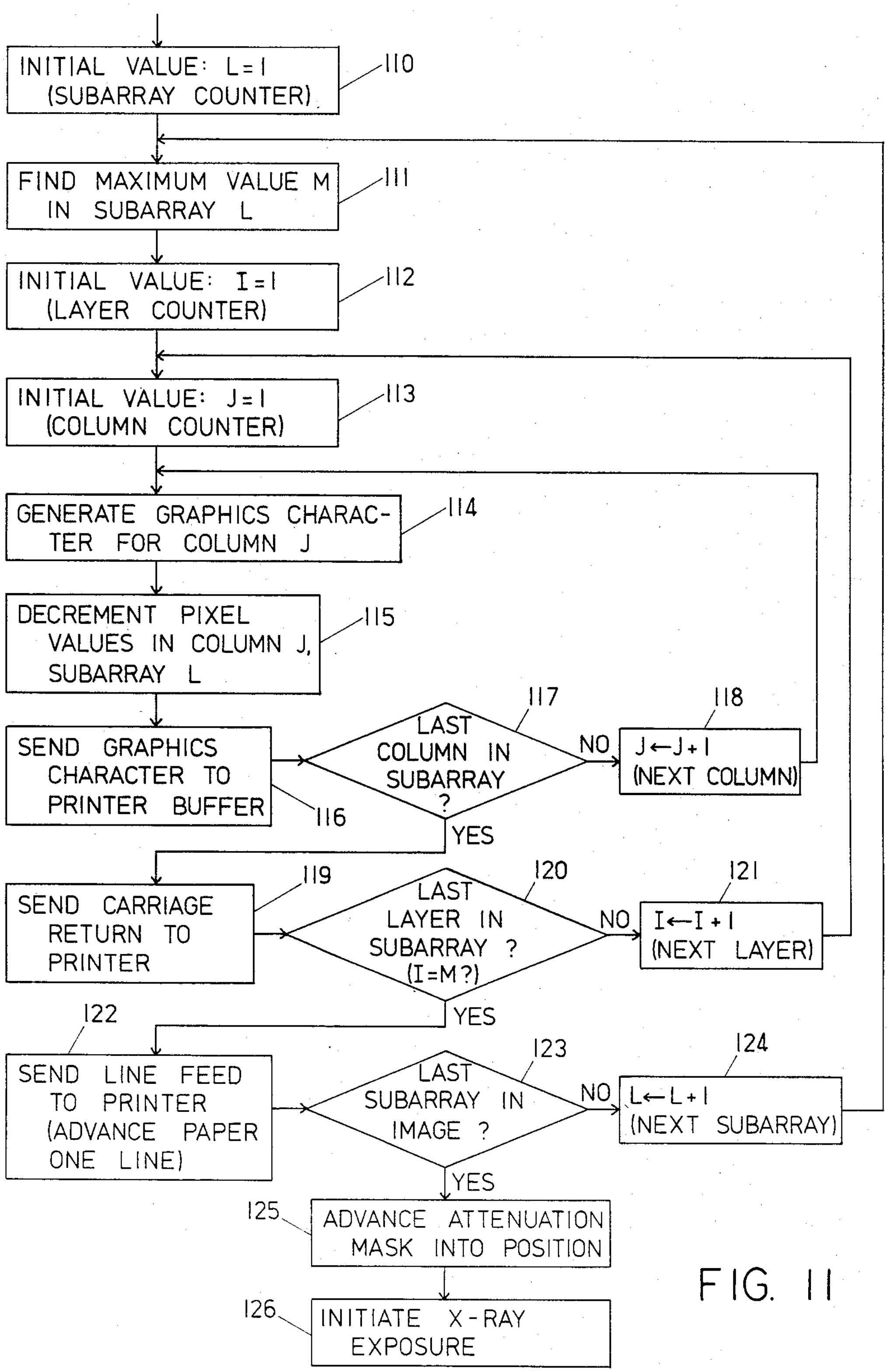
FIG. 11 is a flow chart of a computer program for controlling the printer to print the required number of layers of attenuating material in each pixel in the compensation mask.
Figure 12:
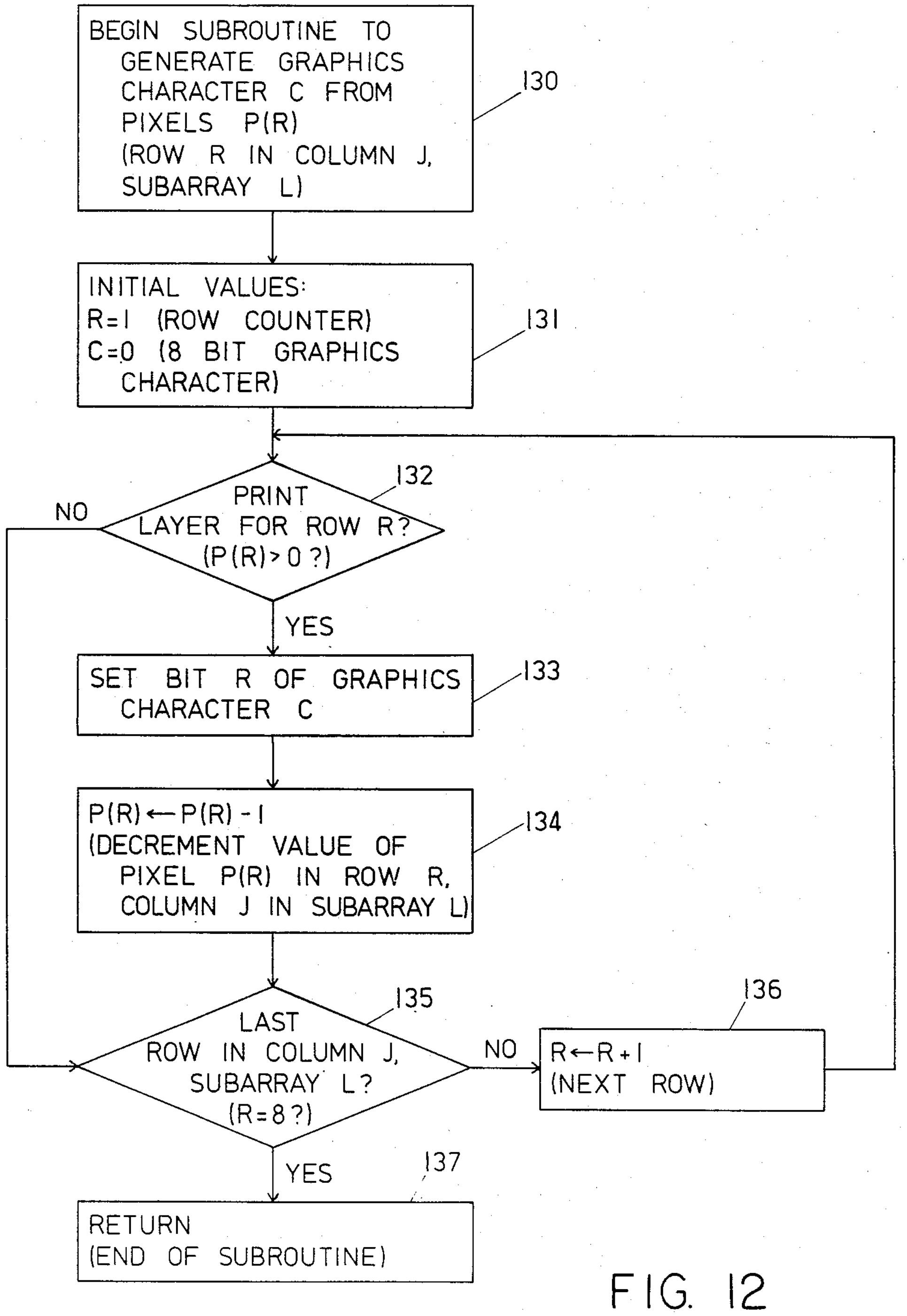
FIG. 12 is a flow chart for a subroutine of the program of FIG. 11 for control of the printer.

A flow chart of the program used to control the printer to generate the attenuation mask is illustrated in FIGS. 10–12. As noted above, the desired number of layers at a particular pixel in the mask is given by the following expression: $n=Q(P-MIN)$.

The program to generate the graphics characters begins by establishing, either from a look-up table or by operator entry, the thickness of a single layer of the attenuation mask (block 100), the gain of the logarithmic transformation, and the effective X-ray energy (block 101), and then determines the value of the attenuation coefficient at the effective energy of the X-ray beam (block 102). These data are then used to calculate the adjustment factor Q (block 103). The minimum pixel value MIN is then determined by searching for this value in the image array (block 104). The program then loops through the image array, replacing each current logarithmic pixel value with the layer number value from the equation above (block 105). Following conversion of all the data in the array, a control character is sent to the printer to initiate its graphic mode of operation (block 106). As a specific example, where the program is used to control a modified Epson 80 MX dot matrix printer having a ribbon with an attenuator material (e.g., cerous oxide) in a carrier laid thereon (available from Kroy Incorporated), a single graphics character controls one column of eight dots on the print head of the printer. This graphics character is therefore generated from the values of one column of eight pixels in the image. The printer prints eight lines of dots across the page in a single pass, with each pass corresponding to a single layer in the attenuation mask. Multiple layers in the mask require multiple passes of the printhead. Therefore, the program first determines the maximum number of layers required in the mask for each subarray of eight lines in the image, then generates the graphic characters for that subarray. This process is repeated for each subarray until the mask for the entire image has been generated. Correspondingly, the flow chart for the program contains three loops. The innermost loop creates a single graphics character for each column of eight pixels in the image. After generation of each character, the values of the corresponding pixels are decremented to indicate that a layer has been printed and the printhead is advanced one column until all columns in the subarray have been printed. This process is repeated in the middle loop until all layers are printed for the subarray. The outer loop repeats the entire process for each eight line subarray in the image. After the last subarray has been completed, the mask is advanced into position between the X-ray tube and the patient and the X-ray exposure is initiated.

The specific program illustrated in the flow chart of FIG. 11 first assigns an initial value of one to the subarray counter (block 110), finds the minimum value M in the subarray L (block 111), sets the initial value of the layer counter equal to one (block 112), sets the initial value of the column counter equal to one (block 113), and then generates the graphics character for column J (block 114). The pixel values in column J and subarray L are then decremented (block 115), the graphics character is sent to the printer buffer (block 116) and a determination is made whether the last column in the subarray has been printed (block 117). If not, the value of the column counter J is incremented by one (block 118) and the program is returned to block 114 to generate the graphics counter for column J. If the last column in the subarray has been sent to the printer buffer as determined at block 117, a carriage return signal is sent to the printer (block 119), and then a check is made to determine if the last layer in the subarray has been sent, i.e., if the number of layers is equal to the maximum value M (block 120). If not, the layer counter is incremented by one (block 121) and the program returns to block 113 to begin calculation of the graphics character for another layer. If the last layer has been printed as determined at block 120, a line feed signal is sent to the printer to advance the paper one line (block 122), and a check is then made to determine if the last subarray in the image has been sent to the printer (block 123). If not, the subarray counter is incremented by one (block 124) and the program returns to block 111 to find the maximum value M in the new subarray and to begin calculation of the characters for that subarray. If the last subarray in the image has been transferred as determined at block 123, a signal is sent to advance the attenuation mask from the printer into position in the path of X-rays (block 125) and thereafter X-ray exposure is initiated.

The details of the program for generating graphic characters is shown in the flow chart of FIG. 12. As noted above, the printhead consists of a single column of eight dots which are controlled individually by an 8-bit graphics character sent to the printer from the computer. If the nth bit of the graphics character is set, then the nth dot in the printhead is printed. For example, if the graphics character has a value of 163, then the first, second, sixth, and eighth dots will be printed, since 163 has the binary equivalent 10100011.

Entry into the subroutine from the main program (block 114 in FIG. 11) is at row R, in column J, of subarray L (block 130). For each column of eight pixels in the image, the value of the graphics character is initiated at 0 and the row counter is initiated at one (block 131). The value of the first pixel in the column is tested (block 132); if positive, the first bit in the graphics character is set (block 133) and the pixel value then decremented (block 134). A test is then made to determine if the last row in column J, subarray L has been generated (i.e., R=8) at block 135. If not, the value of the row counter is incremented by one and the program returns to block 132 to test the value of the next pixel in the column. If the pixel is negative, the program immediately skips to block 135 to test for the last row in column J, subarray L. The process is repeated until all eight pixels in the column have been tested and the graphics character generated. If the last row has been generated, control is returned to the main program (block 137) where the graphics character is sent to the printer.

In addition to the use of the digital beam attenuator of the invention to substantially equalize the X-ray fluence for the purposes discussed above, the same techniques can also be used to suppress or enhance particular body structures such as bone or soft tissue or contrast agents. Energy subtraction radiography not using compensation masks has previously been investigated in connection with digital fluorography systems and line scanned digital radiography systems to provide selective display of bone or soft tissue in applications such as chest radiography, or the suppression of either bone or tissue when investigating iodine concentrations in the body with slow temporal behavior. By employing X-ray compensation masks produced in accordance with the present invention, it is possible to record a high resolution subtraction image with substantial selective material enhancement using screen-film receptors, but not requiring multiple film processing. Referring to FIGS. 3 and 4 for illustration, the technique involves the formation of an attenuation mask based on digital information derived from the electronic receptor 44 when exposed at a first X-ray energy level $E_1$ from the source 41. Following insertion of the mask 51 between the source 41 and the subject 43, a film receptor 54 is placed in front of the electronic receptor 44 and exposed, through the mask, at a second energy level $E_2$. Depending on the details of the preparation of the mask, various material cancellation conditions can exist within the X-ray beam which impinges upon the film. As described further below, the degree of enhancement is a function of spatial frequency, with complete cancellation occuring at low and moderate frequencies and a decreasing amount of cancellation occuring as the maximum frequencies represented by the mask are approached.

With reference first to the X-ray beam of energy $E_1$, it may be assumed for simplicity that in the region of minimum transmission the tissue and bone thicknesses in gm/cm$^2$ are T and B. Elsewhere, the values are t(x,y) and b(x,y) where x,y are the usual two dimensional image coordinates. It may also be assumed that a thickness of mask material $t_m$ (x,y) (corresponding to the single layer thickness X in the attenuation masks described above) is selectively added at each point in order to render the transmission uniform. Through the thickest region a logarithmic transmission ratio for an exposure at energy $E_1$ can be defined as $$L_{1\,min} = \ln\frac{N_{0\,1}}{N_{1\,min}} = \mu_1{}^tT + \mu_1{}^BB$$

where $\mu_1{}^t$ and $\mu_1{}^B$ are the mass attenuation coefficients for tissue and bone respectively at energy $E_1$. At other positions (x,y) the transmission ratio is $$L_1(x,y) = \mu_1{}^t\,t(x,y) + \mu_1{}^B\,b(x,y) + \mu_1{}^m\,t_m(x,y)$$

The minimum mask thickness needed to produce uniform transmission at energy $E_1$ is $$t_m(x,y) = \frac{1}{\mu_1{}^m}\left[L_{1\,min} - \mu_1{}^t\,t(x,y) - \mu_1{}^B\,b(x,y)\right]$$

For simplicity, any mismatch of spatial frequency information between the mask and the subject will be ignored and the (x,y) dependences will not be shown explicitly.

Assuming that, instead of using $t_m$ (the minimum mask thickness required for uniform transmission), $kt_m$ is used, where k is a factor which will permit various types of enhancement in the final image.

Next, with the mask in the beam and the electronic receptor 44 replaced by a film-screen combination 54, an additional exposure is made at energy $E_2$. The film is then exposed to a transmission distribution having a logarithm of the form:

$$L_2 = \mu_2^t t + \mu_2^B b + \frac{\mu_2^m}{\mu_1^m}\cdot(L_{1\,min} - \mu_1^t t - \mu_1^B b)\cdot k$$

$$= \left[\mu_2^t - \left(\frac{\mu_2^m}{\mu_1^m}\cdot\mu_1^t\cdot k\right)\right]\cdot t +$$

$$\left[\mu_2^B - \left(\frac{\mu_2^m}{\mu_1^m}\cdot\mu_1^B\right)\cdot k\right]\cdot b + \frac{\mu_2^m}{\mu_1^m}\cdot k\cdot L_{1\,min}$$

$$= \mu_{eff}^t\cdot t + \mu_{eff}^B\cdot b + \text{constant}$$

Through proper choice of k, the thickness calculated at $E_1$ to produce constant transmission can be modified to achieve various conditions on the effective attenuation coefficients by adjusting the layer thickness.

The foregoing analysis can be used to find the required modification factor k for a desired subtraction condition.

For example, to obtain bone cancellation, $k=\mu_1{}^m/\mu_2{}^m \cdot \mu_2{}^B/\mu_1{}^B$ for which the transmission distribution is $$L_2 = \left( \mu_2^t - \frac{\mu_2^B}{\mu_1^B} \cdot \mu_1^t \right) \cdot t + \text{constant}$$

This result is similar to that obtained in conventional dual-energy digital radiographic implementations of bone cancellation. A major difference is that for the present mask attenuation using film, higher spatial frequency soft tissue detail is available. Partially offsetting this advantage is the fact that bone cancellation is incomplete at higher spatial frequencies.

When bone is cancelled completely, as above, negative defects are left in the image. An alternative is to choose k so that equal thicknesses in centimeters of bone and tissue provide equal signals. This condition, which matches the effective linear attenuation coefficients, can render bone substantially invisible. The cancellation coefficient k for such a case is given by $$K = \frac{\mu_1^m}{\mu_2^m} \cdot \left( \frac{\rho_B \mu_2^B - \rho_t \mu_2^t}{\rho_B \mu_1^B - \rho_t \mu_1^t} \right)$$

Assuming values of $\rho_t=1$ and $\rho_B=1.75$, k is equal to (0.32) $\mu_1{}^m/\mu_2{}^m$ Where iodinated vessels are imaged over soft tissue, with no bone present, the equations required resemble the bone cancellation case with tissue substituted for bone and iodine substituted for tissue.

Other printing techniques may be substituted for the dot matrix printing apparatus discussed above. For example, an ink-jet printer may be utilized to lay down the required multiple layers to form the mask 51. Heavy metal compounds, such as cerous oxide or cerous chloride, can be dispersed into the ink-jet fluid, and evaporation of the fluid can be speeded by heating the paper or the fluid after it is laid on the paper.

Where transfers are made of attenuating material from a ribbon to the substrate, or multiple substrates, the necessary adhesion of the attenuating material to the substrated can be facilitated by using adhesive on the substrate. For example, photograph mounting paper with pressure sensitive adhesive on its surface may conveniently be used as the substrate.

Although cerium, in various compounds, is particularly satisfactory as the X-ray absorbing material for the present application, numerous other X-ray absorbers may be used as well, such as lead, barium, cesium, and cadmium.

Although the invention has been illustrated with reference to a mask 51 of multiple layers built up on a single substrate 50, the compensation mask may be formed of multiple substrates each having one (or more) layers of attenuating material laid in selected pixels. When the multiple substrates are registered over one another, the pixels on each substrate align and the attenuating masses in each aligned pixel add to provide a total attenuating mass for each pixel which yields the desired X-ray attenuation.

It is understood that the invention is not confined to the particular embodiments and techniques set forth herein as illustrative, but embraces such modified forms thereof as come within the scope of the following claims.

What is claimed is:

1. X-ray beam compensation apparatus for forming a compensation mask to be inserted between an X-ray source and an object comprising:

(a) X-ray image receptor means for receiving X-rays passed through the object and providing an output signal indicative of the X-ray intensity at positions in the field of the X-ray fluence received by the receptor means;

(b) image processing means for receiving the output signal from the image receptor means and providing an output signal indicative of the X-ray intensity value from the receptor means at each pixel in a selected two dimensional array of pixels covering at least a portion of the image field of the receptor means;

(c) mask generating control means for receiving the output signal from the image processing means, determining the minimum indicated intensity value from the image processing means in any pixel, determining an attenuation number for each pixel in the array related to the difference between the indicated intensity value for that pixel and the minimum indicated intensity value, and providing a control signal indicative of the attenuation number for each pixel in the array; and (d) mask forming means for receiving the control signal from the control means and forming a compensation mask by depositing on at least one substrate X-ray attenuating masses in a two dimensional array of mask pixels which corresponds to the two dimensional array of pixels in the image field of the receptor means, the thickness of the attenuating mass in each mask pixel being proportional to the attenuation number for such pixel determined by the mask generating control means.

2. The apparatus of claim 1 wherein the X-ray attenuating masses are formed of a carrier material having X-ray absorbing material therein.

3. The apparatus of claim 2 wherein the mask forming means includes a dot matrix printer which prints the attenuating masses onto the substrate.

4. The apparatus of claim 3 wherein the X-ray absorbing material is cerium.

5. The apparatus of claim 1 wherein the mask forming means forms the compensation mask outside of the path of the X-ray beam from the X-ray source, and including means for indexing the mask to register it in proper position in the X-ray beam from the source.

6. The apparatus of claim 5 wherein the mask is registered at a position a distance L from the focal spot of the X-ray source determined from the relation $L=w_mD/W$ where D is the distance of the image receptor means from the focal spot, W is the width of the field of the image receptor means, and $w_m$ is the width of the mask.

7. The apparatus of claim 1 wherein the image receptor means includes a video camera producing a video output signal varying in amplitude as the image field is scanned, and wherein the image processing means receives the video output signal and includes an analog-to-digital converter for converting the video signal to digital data and convolution circuit means for providing convolution of the digital video data.

8. The apparatus of claim 1 wherein the image processing means provides an output signal proportional to the logarithm of the X-ray intensity value from the receptor means at each pixel, and wherein the mask forming means deposits attenuating masses in layers in the mask pixels, the number of layers of attenuating mass in each mask pixel being proportional to the attenuation number for such pixel.

9. The apparatus of claim 8 wherein the X-ray attenuating masses are formed of a carrier having X-ray absorbing material therein.

10. The apparatus of claim 9 wherein the mask forming means includes a dot matrix printer which prints the attenuating masses onto the substrate.

11. The apparatus of claim 10 wherein the X-ray absorbing material is cerium.

12. The apparatus of claim 8 wherein the mask forming means forms the compensation mask outside of the path of the X-ray beam from the X-ray source, and including means for indexing the mask to register it in proper position in the X-ray beam from the source.

13. The apparatus of claim 12 wherein the mask is registered at a position a distance L from the focal spot of the X-ray source determined from the relation $L=w_mD/W$ where D is the distance of the image receptor means from the focal spot, W is the width of the field of the image receptor means, and $w_m$ is the width of the mask.

14. The apparatus of claim 8 wherein the image receptor means includes a video camera producing a video output signal varying in amplitude as the image field is scanned, and wherein the image processing means receives the video output signal and includes an analog-to-digital converter for converting the video signal to digital data, convolution circuit means for providing convolution of the digital video data, and means for providing the logarithm of the intensity data from the convolution circuit means.

15. The apparatus of claim 8 wherein the mask generating control means determines the attenuation number n for each pixel in accordance with the expression $n=(P-MIN)/A\ \mu x$ where A is a logarithmic transformation gain constant, $\mu$ is the linear attenuation coefficient for the attenuating mass material, x is the thickness of one layer of attenuating mass material, MIN is the minimum logarithmic intensity value, and P is the logarithmic intensity value for the pixel, the number of attenuating mass layers in each mask pixel being equal to the attenuation number for such pixel.

16. In an X-ray system having an X-ray source and an X-ray receptor receiving X-rays passed through an object and providing an output signal indicative of the X-ray intensity at positions in the field of the X-ray fluence received by the receptor, the improvement comprising:

(a) image processing means for receiving the output signal from the image receptor and providing an output signal proportional to the logarithm of the X-ray intensity value received by the receptor at each pixel in a selected two dimensional array of pixels covering at least a portion of the image field of the receptor means;

(b) mask generating control means for receiving the output signal from the image processing means, determining the minimum logarithmic intensity value in any pixel, determining an attenuation number for each pixel in the array proportional to the difference between the logarithmic intensity value for that pixel and the minimum logarithmic intensity value, and providing a control signal indicative of the attenuation number for each pixel in the array; and (c) mask forming means for receiving the control signal from the control means and forming a compensation mask by depositing on at least one substrate X-ray attenuating masses in layers in a two dimensional array of mask pixels which corresponds to the two dimensional array of pixels in the image field of the receptor, the number of attenuating mass layers in each mask pixel being proportional to the attenuation number for such pixel determined by the mask generating control means.

17. The system of claim 16 wherein the X-ray attenuating masses are formed of a carrier having X-ray absorbing material therein.

18. The system of claim 17 wherein the mask forming means includes a dot matrix printer which prints the attenuating masses onto the substrate.

19. The system of claim 18 wherein the X-ray absorbing material is cerium.

20. The system of claim 16 wherein the mask forming means forms the compensation mask outside of the path of the X-ray beam from the X-ray source, and including means for indexing the mask to register it in proper position in the X-ray beam from the source.

21. The system of claim 21 wherein the mask is registered at a position a distance L from the focal spot of the X-ray source determined from the relation $L=w_mD/W$ where D is the distance of the image receptor from the focal spot, W is the width of the field of the image receptor, and $w_m$ is the width of the mask.

22. The system of claim 16 wherein the image receptor includes a video camera producing a video output signal varying in amplitude as the image field is scanned, and wherein the image processing means receives the video output signal and includes an analog-to-digital converter for converting the video signal to digital data, convolution circuit means for providing convolution of the digital video data, and means for providing the logarithm of the intensity data from the convolution circuit means.

23. The system of claim 16 wherein the mask generating control means determines the attenuation number n for each pixel in accordance with the expression:

$$n=(P-MIN)/A\ \mu x$$

where A is a logarithmic transformation gain constant, $\mu$ is the linear attenuation coefficient for the attenuating mass material, x is the thickness of one layer of attenuating mass material, MIN is the minimum logarithmic intensity value, and P is the logarithmic intensity value for the pixel, the number of attenuating mass layers in each mask pixel being equal to the attenuation number for such pixel.

24. A method of compensating the X-ray image of an object, comprising the steps of:

(a) exposing an object to a first beam of X-rays;

(b) determining the X-ray intensity passed through the object at each pixel in a two dimensional image array of pixels extending over an image field;

(c) determining a transformed intensity value for each pixel in the image array as a function of the X-ray intensity passed through the object which compensates for non-linear transmission through the object;

(d) forming a compensation mask having a two dimensional mask array of pixels having X-ray attenuation masses located in selected pixels with each pixel in the mask array corresponding to a pixel in the image array, the thickness of the masses in each pixel in the mask array being related to the difference between the transformed intensity value of the corresponding pixel in the image array and the minimum transformed intensity value found in any pixel in the image array;

(e) inserting the compensation mask in registered position between the X-ray source and the object; and (f) exposing the object to a second X-ray beam passed through the compensation mask and recording the image of the X-ray beam after passing through the mask and the object.

25. The method of claim 24 wherein the step of determining a transformed intensity value comprises determining the logarithm of the intensity value for each pixel in the image array.

26. The method of claim 24 in which the step of forming the mask includes the steps of forming the mask in layers on a non-attenuating substrate.

27. The method of claim 24 wherein the step of forming the mask includes the steps of printing X-ray attenuating material in layers onto a non-attenuating substrate at the proper positions to define the attenuating masses within the pixels of the mask array.

28. The method of claim 24 wherein the step of forming the compensation mask is performed outside of the path of a beam of X-rays from the source to the object.

29. The method of claim 24 wherein the step of exposing the object to a first beam of X-rays is performed at a first selected X-ray energy level, the step of exposing the object to a second beam of X-rays is performed at a second selected energy level, and wherein the thicknesses of the attenuating masses in the pixels are chosen to provide substantial cancellation of a selected material in the object at the selected second X-ray energy level.

30. A method of compensating the X-ray image of an object, comprising the steps of:

(a) exposing an object to a first beam of X-rays;

(b) determining the X-ray intensity passed through the object at each pixel in a two dimensional image array of pixels extending over an image field;

(c) determining a logarithmic intensity value for each pixel in the image array which is equal to a constant times the logarithm of the X-ray intensity for each pixel in the array;

(d) determining the minimum logarithmic intensity value for any pixel in the image array;

(e) determining the difference between the logarithmic intensity value at each pixel in the image array and the minimum logarithmic intensity value;

(f) determining an attenuation number for each pixel equal to the difference between the pixel logarithmic intensity value and the minimum logarithmic intensity value times an adjustment coefficient;

(g) depositing attenuating mass material in layers on a non-attenuating substrate to form a compensation mask having a two dimensional array of pixels corresponding to the two dimensional image array of pixels with the number of layers in each pixel in the two dimensional mask array proportional to the attenuation number for such pixel; and (h) exposing the object to a second X-ray beam passed through the compensation mask and recording the image of the X-ray beam after passing through the mask and the object.

31. The method of claim 30 wherein the step of depositing attenuating mass material includes the steps of printing X-ray attenuating material in layers onto a non-attenuating substrate at the proper positions to define the attenuating masses within the pixels of the mask array.

32. The method of claim 30 wherein the step of depositing attenuating mass material is performed outside of the path of a beam of X-rays from the source to the object.

33. The method of claim 30 wherein the step of exposing the object to a first beam of X-rays is performed at a first selected X-ray energy level, the step of exposing the object to a second beam of X-rays is performed at a second selected energy level, and wherein the thickness of the layers in the attenuating masses in the pixels are chosen to provide substantial cancellation of a selected material in the object at the selected second energy level.

34. The method of claim 30 wherein the step of determining an attenuation number determines the number n in accordance with the expression: $n=(P-MIN)/A\ \mu x$ where A is a logarithmic transformation gain constant, $\mu$ is the linear attenuation coefficient for the attenuating mass material, x is the thickness of one layer of attenuating mass material, MIN is the minimum logarithmic intensity value, and P is the logarithmic intensity value for the pixel, the number of attenuating mass layers in each mass pixel being equal to the attenuation number for such pixel.

35. A method of compensating the X-ray image of an object, comprising the steps of:

(a) printing X-ray attenuating material from a ribbon having X-ray attenuating material thereon onto a substrate in layers forming an image to provide a compensation mask;

(b) inserting the compensation mask in registered position between an X-ray source and an object; and (c) exposing the object to an X-ray beam passed through the compensation mask and recording the image of the X-ray beam after passing through the mask and the object.

36. The method of claim 35 wherein the attenuating material is selected from the group consisting of cerium, lead, barium, cesium, cadmium, and compounds thereof.

37. A method of compensating the X-ray image of an object, comprising the steps of:

(a) exposing an object to a beam of X-rays;

(b) determining the X-ray intensity passed through the object at each pixel in a two-dimensional image array of pixels extending over an image field;

(c) depositing attenuating material in layers to form an image on a substrate in pixels in a two dimensional array of pixels on the substrate which corresponds to the two-dimensional image array of pixels to form a compensation mask;

(d) inserting the compensation mask in registered position between the X-ray source and the object; and (e) exposing the object to an X-ray beam passed through the compensation mask and recording the image of the X-ray beam after passing through the mask and the object.

38. The method of claim 37 wherein the step of depositing attenuating material on the substrate comprises printing X-ray attenuating material from a ribbon having X-ray attenuating material thereon onto the substrate.

39. The method of claim 38 wherein the attenuating material is selected from the group consisting of cerium, lead, barium, cesium, cadmium, and compounds thereof.

* * * * *